United States Patent
Choi et al.

(10) Patent No.: US 7,911,537 B2
(45) Date of Patent: Mar. 22, 2011

(54) MULTICHANNEL VIDEO RECEPTION APPARATUS AND METHOD FOR DIGITAL BROADCASTING

(75) Inventors: Kwang-Pyo Choi, Anyang-si (KR); Kwang-Cheol Choi, Gwacheon-si (KR); Young-O Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1155 days.

(21) Appl. No.: 11/441,512

(22) Filed: May 26, 2006

(65) Prior Publication Data

US 2006/0285015 A1    Dec. 21, 2006

(30) Foreign Application Priority Data

May 26, 2005  (KR) ............................ 10-2005-44693

(51) Int. Cl.
*H04N 5/45* (2006.01)
*H04N 5/268* (2006.01)
*H04N 5/445* (2006.01)
*H04N 9/64* (2006.01)
*H04N 5/50* (2006.01)

(52) U.S. Cl. ........ 348/565; 348/567; 348/706; 348/714; 348/718; 348/731

(58) Field of Classification Search .......... 348/564–565, 348/567–568, 705, 706, 714–716, 718, 731, 348/732; 725/90
See application file for complete search history.

(56) References Cited

U.S. PATENT DOCUMENTS

| | | | | |
|---|---|---|---|---|
| 5,598,222 A * | 1/1997 | Lane | ............................. | 348/568 |
| 5,926,227 A * | 7/1999 | Schoner et al. | ............... | 348/512 |
| 5,969,768 A * | 10/1999 | Boyce et al. | ................... | 348/565 |
| 6,041,068 A * | 3/2000 | Rosengren et al. | ........... | 370/538 |
| 6,100,932 A * | 8/2000 | Boyce et al. | ............. | 375/240.16 |
| 6,115,080 A * | 9/2000 | Reitmeier | ...................... | 348/731 |
| 6,212,680 B1 * | 4/2001 | Tsinberg et al. | ................ | 725/39 |
| 6,262,770 B1 * | 7/2001 | Boyce et al. | ................ | 348/402.1 |
| 6,272,680 B1 * | 8/2001 | Gaughan et al. | .............. | 725/112 |
| 6,473,130 B1 * | 10/2002 | Kim | ............................. | 348/565 |
| 6,473,137 B1 * | 10/2002 | Godwin et al. | ............... | 348/725 |

(Continued)

FOREIGN PATENT DOCUMENTS

KR    1020030009669 A    2/2003

*Primary Examiner* — Brian Yenke

(74) *Attorney, Agent, or Firm* — The Farrell Law Firm, P.C.

(57) ABSTRACT

Provided is a multichannel video reception apparatus of a mobile communication terminal for digital broadcasting. An RF processor receives a broadcast signal of a digital broadcast service via an antenna. A baseband processor processes the received broadcast signal in a baseband. A controller controls the RF processor and the baseband processor to receive the broadcast signal including video frames of a main channel and a sub-channel. A memory stores a program code, reference data, and updatable user data, for an operation of the controller. A video processor receives the video frames of the main channel and the sub-channel, decodes the latest key frame of the sub-channel if a key frame of the main channel occurs while decoding the video frames of the main channel, and after decoding the key frame of the sub-channel, decodes the frames of the main channel. A display divides the decoded video signal into a main-channel image and a sub-channel image and separately displays the images. An audio processor outputs an audio signal of the digital broadcast service included in the broadcast signal.

18 Claims, 7 Drawing Sheets

U.S. PATENT DOCUMENTS

| | | | |
|---|---|---|---|
| 6,636,271 B1 * | 10/2003 | Megeid | 348/559 |
| 6,680,754 B1 * | 1/2004 | Yim | 348/565 |
| 6,774,918 B1 * | 8/2004 | Muth | 715/716 |
| 6,784,945 B2 * | 8/2004 | Norsworthy et al. | 348/731 |
| 6,804,824 B1 * | 10/2004 | Potrebic et al. | 725/38 |
| 6,917,652 B2 * | 7/2005 | Lyu | 375/240.25 |
| 6,950,624 B2 * | 9/2005 | Kim et al. | 455/3.01 |
| 6,980,257 B2 * | 12/2005 | Fairhurst et al. | 348/589 |
| 6,985,188 B1 * | 1/2006 | Hurst, Jr. | 348/553 |
| 7,043,059 B2 * | 5/2006 | Cheatle et al. | 382/112 |
| 7,164,448 B2 * | 1/2007 | Iipko et al. | 348/564 |
| 7,307,669 B2 * | 12/2007 | Bhatia et al. | 348/581 |
| 7,375,761 B2 * | 5/2008 | Oku et al. | 348/441 |
| 7,400,360 B2 * | 7/2008 | Linzer | 348/564 |
| 7,528,889 B2 * | 5/2009 | Bhatia et al. | 348/581 |
| 7,532,253 B1 * | 5/2009 | Greenberg | 348/565 |
| 7,561,777 B2 * | 7/2009 | Carlsgaard et al. | 386/95 |
| 7,634,794 B1 * | 12/2009 | Paik et al. | 725/62 |
| 7,644,425 B2 * | 1/2010 | Parker et al. | 725/41 |
| 2001/0007576 A1 * | 7/2001 | Lyu | 375/240.25 |
| 2002/0106025 A1 * | 8/2002 | Tsukagoshi et al. | 375/240.16 |
| 2002/0110286 A1 * | 8/2002 | Cheatle et al. | 382/305 |
| 2003/0016304 A1 * | 1/2003 | Norsworthy et al. | 348/565 |
| 2004/0003399 A1 * | 1/2004 | Cooper | 725/38 |
| 2004/0028142 A1 * | 2/2004 | Kim | 375/240.25 |
| 2004/0181813 A1 * | 9/2004 | Ota et al. | 725/131 |
| 2004/0189690 A1 * | 9/2004 | Poslinski et al. | 345/719 |
| 2004/0194134 A1 * | 9/2004 | Gunatilake et al. | 725/38 |
| 2006/0050790 A1 * | 3/2006 | Eerenberg et al. | 375/240.24 |
| 2006/0082685 A1 * | 4/2006 | Nam et al. | 348/565 |
| 2006/0109380 A1 * | 5/2006 | Salomons | 348/565 |
| 2007/0192816 A1 * | 8/2007 | Collet et al. | 725/116 |
| 2007/0250896 A1 * | 10/2007 | Parker et al. | 725/135 |
| 2009/0015725 A1 * | 1/2009 | Park | 348/731 |

* cited by examiner

MULTICHANNEL VIDEO RECEPTION APPARATUS AND METHOD FOR DIGITAL BROADCASTING

PRIORITY

This application claims the benefit under 35 U.S.C. §119 (a) of an application entitled "Multichannel Video Reception Apparatus and Method for Digital Broadcasting" filed in the Korean Intellectual Property Office on May 26, 2005 and assigned Serial No. 2005-44693, the entire contents of which are incorporated herein by reference.

BACKGROUND OF THE INVENTION

1. Field of the Invention

The present invention relates generally to video decoding, and in particular, to a multichannel video reception apparatus and method for digital broadcasting.

2. Description of the Related Art

In general, a digital broadcasting system, such as Digital Multimedia Broadcasting (DMB), simultaneously transmits the video data generated through coding/modulation/multiplexing processes over several service channels. A receiver receives desired video service data by demultiplexing a particular service channel. As there is an increasing demand for Quality-of-Service (QoS), and as the video technology has developed, the user can view video images of multiple channels (i.e., multichannel video images) on one screen of the receiver. Picture-in-Picture (PiP) is a typical example of the multichannel video images. PiP is useful when the user desires to view or scan other service programs with a smaller display screen while viewing a first selected service program with a larger display screen. The technology associated therewith includes an Electronic Program Guide (EPG) in which the user scans other service channels while receiving (or viewing) video data of a desired service channel on a screen.

In order to simultaneously decode video data received through more than two service channels in this way, there is a need for more than two video decoders.

Figure 1:
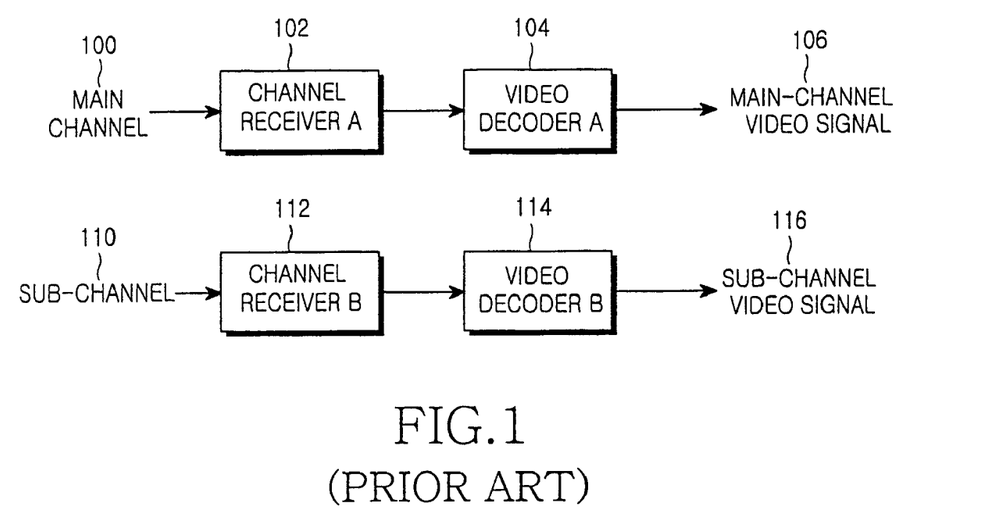
FIG. 1 is a block diagram illustrating a multichannel video receiver with two video decoders according to the prior art.

FIG. 1 is a block diagram illustrating a multichannel video receiver with two video decoders according to the prior art.

As illustrated, a service channel primarily desired by the user is mapped to a main channel 100, and a service channel secondarily desired by the user is mapped to a sub-channel 110. In another case, a service channel desired by the user is mapped to the main channel 100, and a service channel the user desires to scan is mapped to the sub-channel 110. A received signal including video data of the main channel 100 is demultiplexed/demodulated by a channel receiver A 102, and then input to a video decoder A 104. The video decoder A 104 decodes the data output from the channel receiver A 102, and outputs a main-channel video signal 106. The main-channel video signal 106 is displayed on a screen after passing through a video buffer (not shown). Similarly, a received signal including video data of the sub-channel 110 is demultiplexed/demodulated by a channel receiver B 112, and then input to a video decoder B 114. The video decoder B 114 decodes the data output from the channel receiver B 112, and outputs a sub-channel video signal 116. The sub-channel video signal 116 is displayed on a screen after passing through a video buffer (not shown). The sub-channel video image can be down-sized according to its displaying size on the screen.

The use of two or multiple video decoders can maximize video decoding performance, but is not appropriate for a portable DMB receiver due to the high system complexity. In addition, the use of an additional decoder for the service requiring lower-resolution video processing for the sub-channel, like the PiP and EPG, unnecessarily increases the system complexity.

SUMMARY OF THE INVENTION

To substantially solve at least the above problems and/or disadvantages and to provide at least the advantages below, the present invention provides an apparatus and method for efficiently simultaneously decoding video images transmitted from more than two service channels, using one video decoder.

According to one aspect of the present invention, there is provided a multichannel video reception apparatus of a mobile communication terminal for digital broadcasting. The apparatus includes a radio frequency (RF) processor for receiving a broadcast signal of a digital broadcast service via an antenna; a baseband processor for processing the received broadcast signal in a baseband; a controller for controlling the RF processor and the baseband processor to receive the broadcast signal including video frames of a main channel and a sub-channel, the video frames representing coded video data; a memory for storing a program code, reference data, and updatable user data, for an operation of the controller; a video processor for receiving the video frames of the main channel and the sub-channel, decoding the latest key frame of the sub-channel if a key frame of the main channel occurs while decoding the video frames of the main channel, and after decoding the key frame of the sub-channel, decoding the frames of the main channel; a display for dividing the decoded video signal into a main-channel image and a sub-channel image and separately displaying the images; and an audio processor for outputting an audio signal of the digital broadcast service included in the broadcast signal.

Preferably, the video processor includes a key frame extractor for receiving frames representing coded video data of the sub-channel, extracting a key frame among the frames of the sub-channel, and storing the extracted key frame; a key frame recognizer for receiving frames representing coded video data of the main channel, and detecting a key frame among the frames of the main channel; a channel selector for outputting the frames of the main channel upon failure to detect a key frame of the main channel, outputting the stored key frame of the sub-channel upon detecting the key frame of the main channel by the key frame recognizer, and after outputting the key frame of the sub-channel, outputting the key frame of the main channel and its succeeding frames; and a video decoder for decoding frames of the main channel or the sub-channel, output from the channel selector, and outputting video signals.

According to another aspect of the present invention, there is provided a multichannel video reception method for digital broadcasting. The method includes receiving a frame representing coded video data of a main channel, and determining whether the received frame of the main channel is a key frame; if the received frame of the main channel is not a key frame, decoding a non-key frame of the main channel and outputting the decoded non-key frame as a video signal of the main channel; if the received frame of the main channel is a key frame, decoding the previously stored latest key frame of a sub-channel, and outputting the decoded key frame as a video signal of the sub-channel; and after decoding the key frame of the sub-channel, decoding a key frame of the main channel and outputting the decoded key frame of the main channel as a video signal of the main channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention efficiently and simultaneously decodes video images received from two or more service channels, using one video decoder. A service channel primarily desired by a user becomes a main channel, and another service channel secondarily desired by the user, or another service channel the user desires to scan becomes a sub-channel. One video decoder connectable to both the main channel and the sub-channel decodes major frames of the sub-channel at a possible time, while decoding video frames of the main channel.

Herein, the term "possible time" refers to the time when a key frame occurs in the main channel. Most video technologies transmit a differential frame indicating a difference between a previous video frame and the current video frame, i.e., a non-key frame, in order to minimize a size of video frames transmitted at a predetermined frame rate. The differential frame includes only the coded video information for the part non-identical to the previous video frame, depending on the previous frame. For decoding of the differential frame, a key frame including coded video information having no correlation with the previous/next video frames is transmitted. The key frame includes coded video information for the entire video image at a corresponding time regardless of the previous video frame. This key frame can be transmitted periodically, or at a time when the video image undergoes a great change. An example of the key frame includes an Intra (I) type frame for H.263 or Moving Picture Experts Group (MPEG)-4 part-2, and an Instantaneous Decoder Refresh (IDR) type frame for MPEG-4 part-10/H.264.

Aside from the coded video data included in the key frame, the important information necessary for decoding, such as size information and basic quantization value of the video image, can be included in the key frame. For example, the important information includes Video Object Layer (VOL) for MPEG-4 part-2, and Sequence Parameter Set (SPS) and Picture Parameter Set (PPS) for MPEG-4 part-10/H.264.

It is possible to determine whether the coded video frame is a key frame, from a header of the coded video information. For example, for MPEG-4 part-10/H.264, if nal_unit_type of a Network Adaptation Layer (NAL) header is '00101', it indicates that the coded video frame is an IDR type coded video frame. With the use of the nal_unit_type, it is possible to determine the type of the coded video frame without fully decoding the coded video data.

Figure 2:
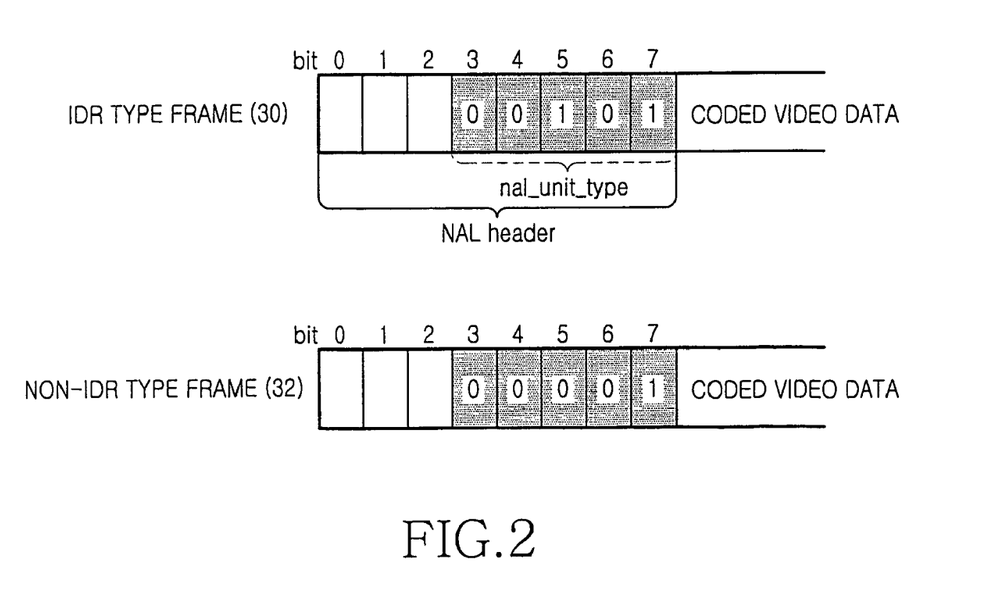
FIG. 2 is a diagram illustrating a format of MPEG-4 part-10/H.264 frames.

FIG. 2 is a diagram illustrating a format of MPEG-4 part-10/H.264 frames.

As illustrated, the first 8 bits of each of an IDR type frame 30 and a non-IDR type frame 32 constitute an NAL header. Of the 8 bits, 5 Least Significant Bit (LSB) bits constitute an nal_unit_type field indicating a type of the succeeding coded video data. If a value of the nal_unit_type field is '00101', it indicates that the succeeding coded video data is the IDR type, and if a value of the nal_unit_type field is '00001', it indicates that the succeeding coded video data is the non-IDR type.

Figure 3:
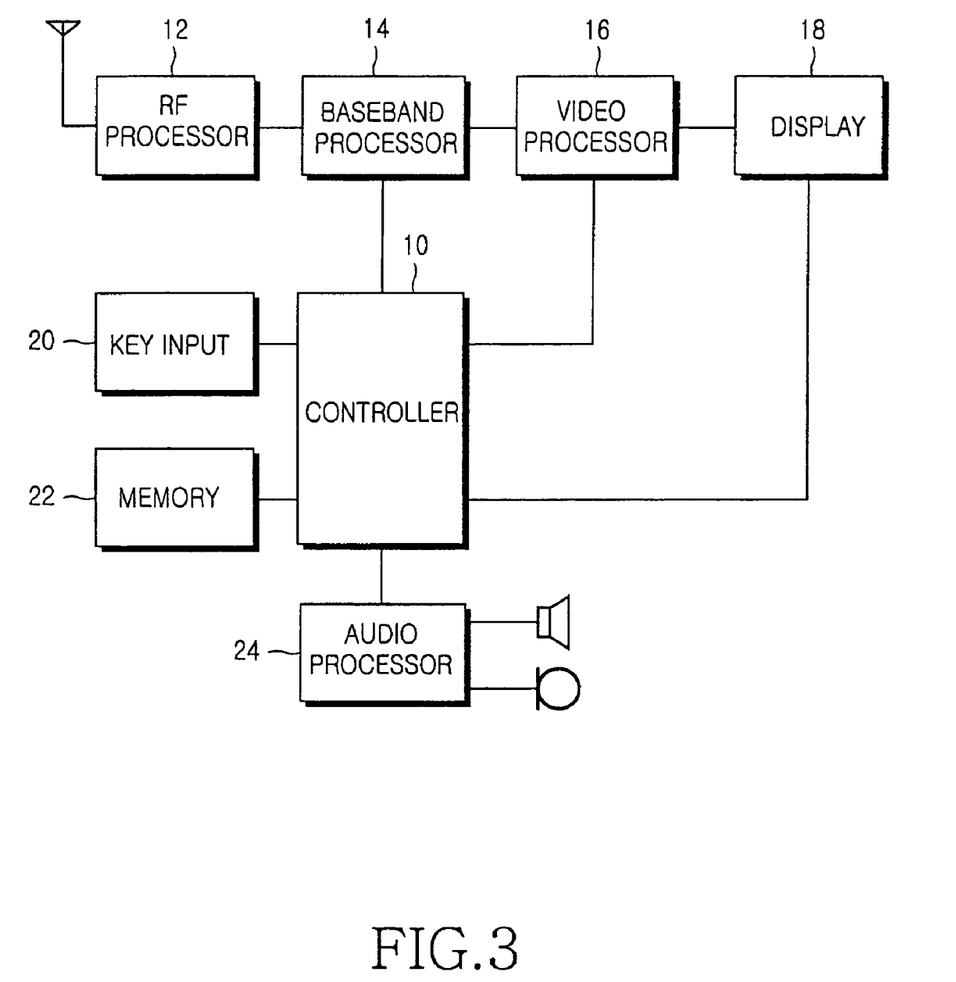
FIG. 3 is a diagram illustrating a structure of a mobile communication terminal capable of multichannel video reception according to the present invention.

FIG. 3 is a diagram illustrating a structure of a mobile communication terminal capable of multichannel video reception according to the present invention. The mobile communication terminal includes a Radio Frequency (RF) processor 12, a baseband processor 14, a controller 10, a video processor 16, a display 18, a key input unit 20, a memory 22, and an audio processor 24. Herein, the mobile communication terminal capable of receiving digital broadcast service, such as DMB service and Digital Video Broadcasting-Handheld (DVB-H) service, is shown as an example of the multichannel video receiver of the present invention.

Referring to FIG. 3, the RF processor 12 can receive a communication signal based on a radio access technology of the mobile communication terminal and can also receive a broadcast signal from a digital broadcasting system via an antenna. The baseband processor 14 processes the communication signal and the broadcast signal in a baseband. The controller 10 operates using program codes, reference data and various updatable user data, stored in the memory 22, and controls communication of the RF processor 12 and the baseband processor 14. The display 18, under the control of the controller 10, displays a state of the mobile communication terminal and the user information, and in particular, outputs video data of the digital broadcast service according to the procedure described below. The audio processor 24, connected to a speaker and a microphone, performs voice communication and outputs audio data of the digital broadcast service according to the procedure described below, under the control of the controller 10.

If the user requests reception of the DMB service by manipulating the key input unit 20, or if a DMB service request is received in another method, the controller 10 receives a broadcast signal using the video processor 16 by controlling the RF processor 12 and the baseband processor 14. The received broadcast signal includes video data coded by the digital broadcasting system, i.e., includes video frames. If the user desires to receive multiple broadcast service channels, the baseband processor 14 demodulates/decodes broadcast signals of the requested broadcast service channels, and provides the resultant broadcast signals to the video processor 16.

The video processor 16 receives the video frames. In this case, video frames of a main channel, which is a service channel primarily desired by the user, and video frames of a sub-channel, which is a service channel secondarily desired by the user, or a service channel the user desires to scan, are input to the video processor 16. The video processor 16 temporarily holds a key frame of the main frame (for example, for a one-frame duration) and decodes the latest key frame of the sub-channel at the time that the key frame of the main channel occurs, while it is decoding video frames of the main channel. After decoding the key frame of the sub-channel, the video processor 16 resumes the decoding of the main channel. The decoded video signal is divided into a main-channel video signal and a sub-channel video signal, and then output through the display 18.

The display 18 can have a single screen or multiple screens. The display 18 outputs the main-channel video signal with a larger part in the single screen, and outputs the sub-channel video signal with a smaller part in the single screen. Alternatively, the display 18 separately outputs the main-channel video signal and the sub-channel video signal on their associated screens.

Figure 4:
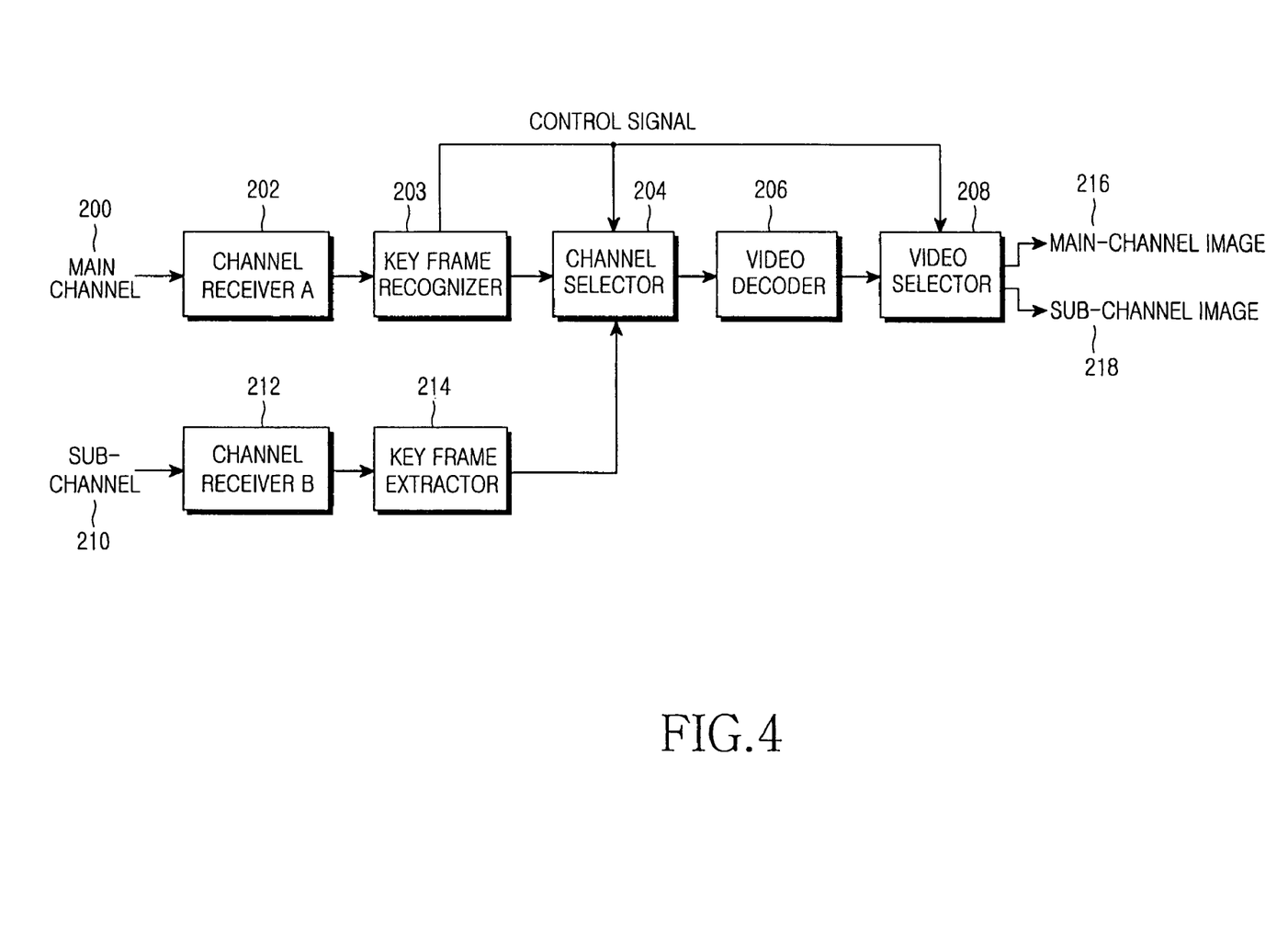
FIG. 4 is a block diagram illustrating a multichannel video receiver with a single video decoder according to the present invention.

FIG. 4 is a block diagram illustrating a multichannel video receiver with a single video decoder according to the present invention. The multichannel video receiver includes a channel receiver A 202 for a main channel 200, a channel receiver B 212 for a sub-channel 210, a key frame recognizer 203 for the main channel 200, a key frame extractor 214 for the sub-channel 210, a channel selector 204, a video decoder 206, and a video selector 208. The channel receivers 202 and 212 are included in the RF processor 12 and the baseband processor 14 of FIG. 3.

Referring to FIG. 4, a service channel primarily desired by the user is mapped to the main channel 200, and a service channel secondarily desired by the user is mapped to the sub-channel 210. In another case, a service channel desired by the user is mapped to the main channel 200, and a service channel the user desires to scan is mapped to the sub-channel 210. A received signal including video data of the main channel 200 is demultiplexed/demodulated by the channel receiver A 202. Similarly, a received signal including video data of the sub-channel 210 is demultiplexed/demodulated by the channel receiver B 212.

The channel receiver A 202 outputs consecutive frames containing coded video information of the main channel 200. The key frame recognizer 203 recognizes key frames by analyzing headers of the main-channel frames, and upon detecting a main-channel key frame, provides a control signal to the channel selector 204 and the video selector 208.

The channel receiver B 212 outputs consecutive frames containing coded video information of the sub-channel 210. The key frame extractor 214 attempts to detect a key frame by analyzing the sub-channel frames, and upon detecting a sub-channel key frame, stores the sub-channel key frame in its buffer (not shown). If the next sub-channel key frame is detected before the current sub-channel key frame is output, the key frame extractor 214 clears the buffer to the previously stored sub-channel key frame, and stores the next sub-channel key frame in the buffer. In this manner, the key frame extractor 214 always stores the latest sub-channel key frame. At this time, differential frames of the sub-channel 210 are discarded.

The channel selector 204 simply bypasses the main-channel frames received via the key frame recognizer 203 to the video decoder 206, when a control signal indicating generation of the main-channel key frames is not generated by the key frame recognizer 203. On the contrary, when the control signal is generated, the channel selector 204 reads out the sub-channel key frame buffered in the key frame extractor 214 and delivers the read sub-channel key frame to the video decoder 206. After delivering the sub-channel key frame, the channel selector 204 delivers again the main-channel key frames to the video decoder 206 beginning at the sub-channel key frame.

When the control signal is generated as stated above, the decoding of the main-channel key frames is temporarily held and the sub-channel key frame is input to the video decoder 206 by the channel selector 204. That is, the sub-channel key frame is input to the video decoder 206 before the main-channel key frame is input to the video decoder 206. At this moment, the main-channel key frame can be temporarily stored in the buffer of the channel receiver A 202 together with the succeeding non-key frames. In another case, the video decoder 206, if it has a capability of operating at sufficiently high speed, decodes the sub-channel key frame, while the decoding of the main channel is temporarily held, and successively decodes the main-channel key frame and the non-key frames.

The video decoder 206 decodes the video frames received via the channel selector 204, and outputs video signals mapped to the respective frames. If the received frame is not a key frame but a differential frame, the video decoder 206 combines the received differential frame with the previously processed frame to restore a video signal of the corresponding channel. On the contrary, if the received frame is a key frame, the video decoder 206 refreshes the existing video processing, and restores a video signal of the corresponding channel only with the key frame. Herein, the procedure for restoring the video signal by the video decoder 206 follows the video coding technology, and a detailed description thereof will be omitted, because it is not related to the gist of the present invention.

The video signals output from the video decoder 206 are input to the video selector 208. When the control signal indicating generation of the main-channel key frames is not generated by the key frame recognizer 203, the video selector 208 outputs the video signals output from the video decoder 206 as a main-channel image 216, after waiting a one-frame processing time of the video decoder 206. The main-channel image 216 is displayed on a main screen, or stored at the user's request. On the contrary, when the control signal is generated, the video selector 208 outputs the video signal output from the video decoder 206 as a sub-channel image 218, after waiting the one-frame processing time of the video decoder 206. Similarly, the sub-channel image 218 is displayed on a sub-screen, or stored at the user's request. In the case of PiP, the main screen may be the entire display screen, and the sub-screen may be a part (or window) of the main screen.

Figure 5:
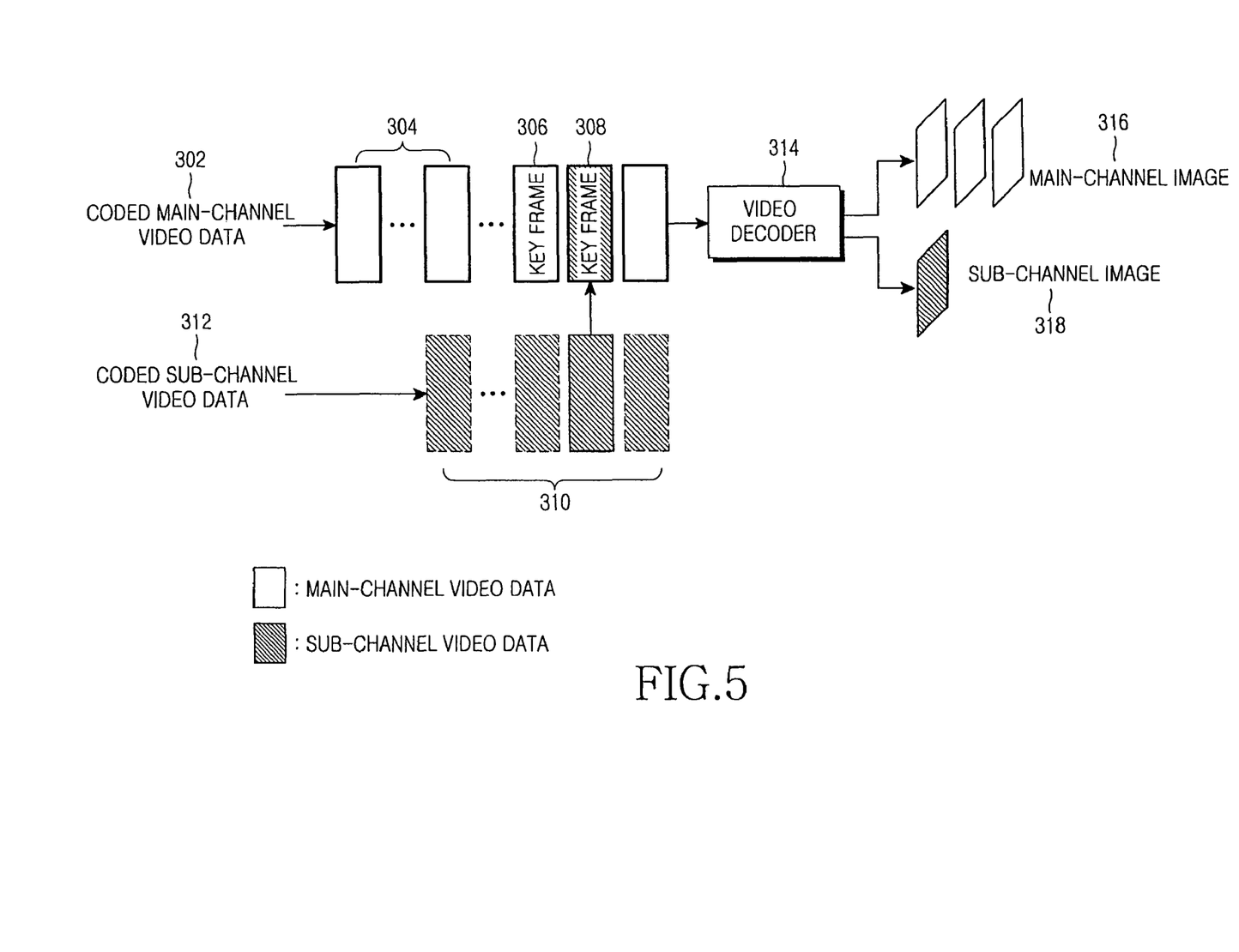
FIG. 5 is a conceptual diagram illustrating a decoding procedure of a main channel and a sub-channel according to the present invention.
Figure 6:
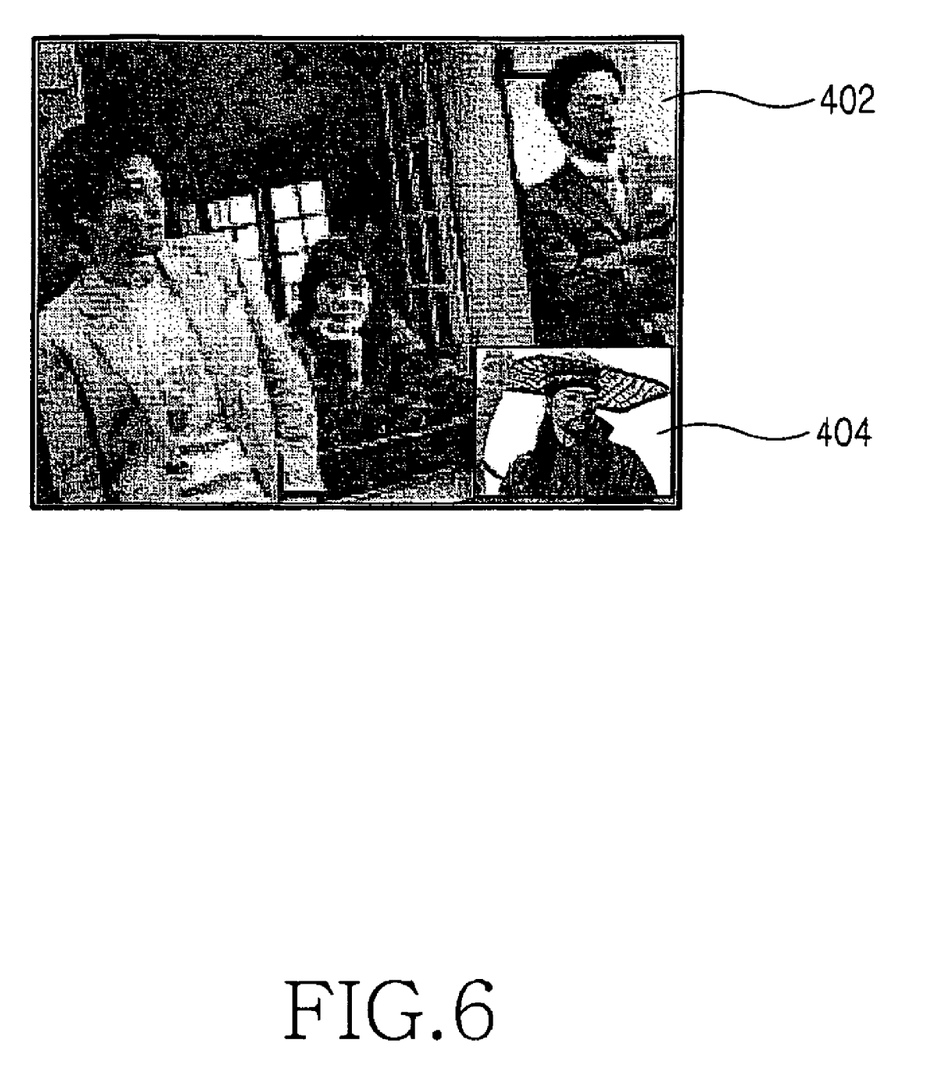
FIG. 6 is a diagram illustrating an exemplary display screen through which a main channel and a sub-channel are simultaneously output.

FIG. 5 is a conceptual diagram illustrating a decoding procedure of a main channel and a sub-channel according to the present invention. FIG. 6 is a diagram illustrating an exemplary display screen through which a main channel and a sub-channel are simultaneously output.

As illustrated, coded video data 302 obtained from a main channel includes several differential frames 304 and a key frame 306. Similarly, coded video data 312 of a sub-channel includes several differential frames 310 and a key frame 308. A video decoder 314, in the course of normally decoding frames of the main channel, receives the previously extracted key frame 308 of the sub-channel before the key frame 306 of the main channel is received, and decodes the received key frame 308. At this time, the main-channel key frame 306 and its succeeding non-key (differential) frames 304 can be temporarily stored by a channel receiver A 202 or other constituent elements. After the sub-channel key frame 308 is decoded by the video decoder 314, the decoded video signal is output to a sub-screen 404 as a sub-channel image 318 by the video selector 208. After the sub-channel key frame 308 is decoded, the video decoder 314 starts again decoding the main-channel key frame 306 and its succeeding non-key frames 304. The decoded video signal corresponding to the main-channel frames 306 and 304 is output to a main screen 402 as a main-channel image 316 by the video selector 208.

In this way, by temporarily delaying the main-channel key frame and decoding the previously stored sub-channel key frame whenever the main-channel key frame occurs, it is possible to obtain a sub-channel image without affecting the quality of the main-channel image. In most cases, because the user simply desires to recognize the service contents of the sub-channel, it is possible to meet the user's demand for the sub-channel by simply providing a sub-screen that is smaller in size and lower in frame rate than the main screen.

Figure 7:
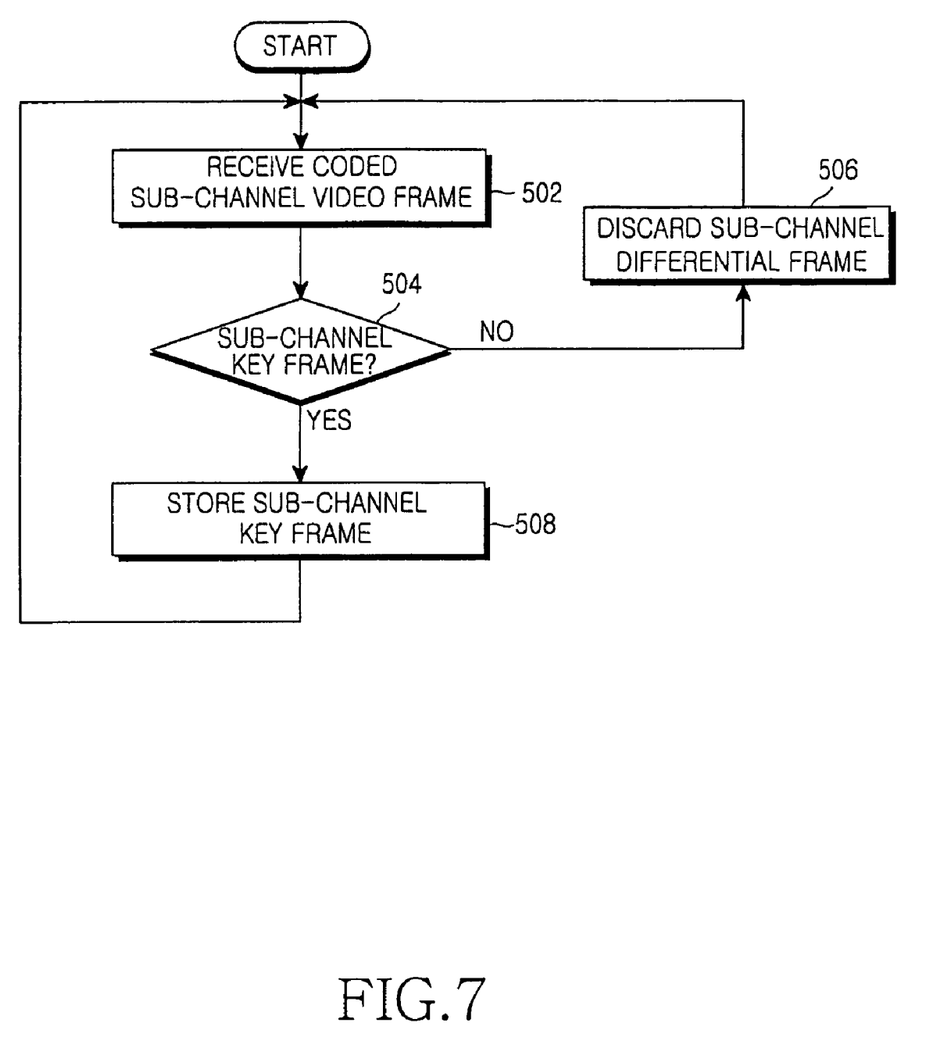
FIG. 7 is a flowchart illustrating an operation of storing a sub-channel key frame according to the present invention.

FIG. 7 is a flowchart illustrating an operation of storing a sub-channel key frame according to the present invention.

As illustrated, a multichannel video receiver receives a coded sub-channel video frame in step 502, and analyzes a header of the received frame in step 504 to determine whether the received frame is a sub-channel key frame. If the received frame is not a sub-channel key frame, the multichannel video receiver determines the received frame to a sub-channel differential frame and discards the sub-channel differential frame in step 506. On contrary, if the received frame is a sub-channel key frame, the multichannel video receiver stores the sub-channel key frame in a key frame extractor in step 508. Thereafter, the multichannel video receiver returns to step 502, and repeats its succeeding steps every time a sub-channel key frame is received. By doing so, the key frame extractor always stores the latest sub-channel key frame.

Figure 8:
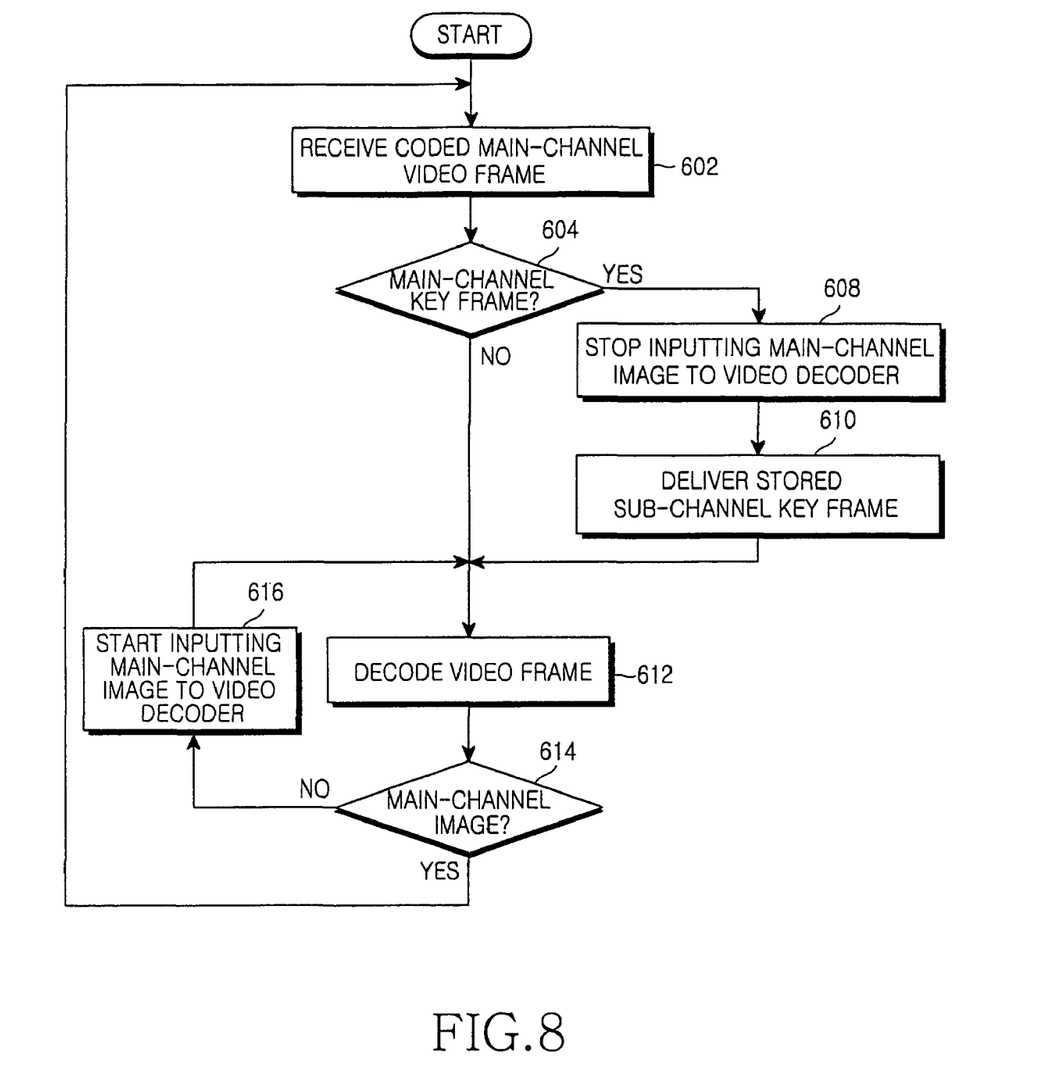
FIG. 8 is a flowchart illustrating an operation of decoding a multichannel video image according to the present invention.

FIG. 8 is a flowchart illustrating an operation of decoding a multichannel video image according to the present invention.

As illustrated, a multichannel video receiver receives a coded main-channel video frame in step 602, and analyzes a header of the received frame in step 604 to determine whether the received frame is a main-channel key frame. If the received key frame is not a main-channel key frame, the multichannel video receiver determines the received frame is a main-channel differential frame, and immediately delivers the main-channel differential frame to a video decoder. On the contrary, if the received frame is a main-channel key frame, the multichannel video receiver temporarily holds inputting of the main-channel video image to the video decoder in step 608, and delivers the latest sub-channel key frame stored in a key frame extractor to the video decoder in step 610.

In step 612, the video decoder decodes the received sub-channel differential frame or the sub-channel key frame, and outputs a video signal. Although not illustrated, if there is no sub-channel key frame stored in the key frame extractor at the time when the main-channel key frame occurs, the main-channel key frame is immediately delivered to the video decoder. The multichannel video receiver determines in step 614 whether the video signal is related to the main-channel video image or the sub-channel video image. If the video signal is related to the main-channel video image, the multichannel video receiver outputs the video signal to a main screen and returns to step 602 to receive the next main-channel frame. However, if the video signal is related to the sub-channel video image, the multichannel video receiver outputs the video signal to a sub-screen. Thereafter, the multichannel video receiver delivers the main-channel key frame to the video decoder in step 616, and the video decoder decodes the temporarily held main-channel key frame into a video signal in step 612. After the main-channel key frame is decoded, the multichannel video receiver returns to step 602 to receive the next main-channel frame.

If the multichannel video receiver decodes a sub-channel video image with one general video decoder in the course of decoding a coded main-channel video image, the contents stored in a frame buffer of the video decoder are damaged, causing considerable image degradation when the video receiver later decodes again the main-channel video image. However, the multichannel video receiver of the present invention decodes a sub-channel key frame every time a main-channel key frame occurs, making it possible to obtain a sub-channel video image in units of key frames without deteriorating the quality of the main-channel video image. In particular, this technology can be effectively applied to PiP and realtime EPG services in the digital broadcasting system such as DMB and DVB-H systems.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A multichannel video reception apparatus of a mobile communication terminal for receiving digital broadcasting, the apparatus comprising:
   a radio frequency (RF) processor for receiving a broadcast signal of a digital broadcast service via an antenna;
   a baseband processor for processing the received broadcast signal in a baseband;
   a controller for controlling the RF processor and the baseband processor to receive the broadcast signal including video frames of a main channel and a sub-channel, the video frames representing coded video data;
   a memory for storing a program code, reference data, and updatable user data, for an operation of the controller;
   a video processor for receiving the video frames of the main channel and the sub-channel, decoding a latest key frame of the sub-channel when a key frame of the main channel occurs while decoding the video frames of the main channel, and decoding the frames of the main channel after decoding the latest key frame of the sub-channel; and
   a display for dividing the decoded video signal into a main-channel image and a sub-channel image and separately displaying the images,
   wherein the main channel and the sub-channel are respectively determined among a plurality of channels according to a predetermined priority.

2. The multichannel video reception apparatus of claim 1, further comprising an audio processor for outputting an audio signal of the digital broadcast service included in the broadcast signal.

3. The multichannel video reception apparatus of claim 1, wherein the video processor comprises:
   a key frame extractor for receiving frames representing coded video data of the sub-channel, extracting a key frame among the frames of the sub-channel, and storing the extracted key frame;

a key frame recognizer for receiving frames representing coded video data of the main channel, and detecting a key frame among the frames of the main channel;

a channel selector for outputting the frames of the main channel upon failure to detect the key frame of the main channel, outputting the stored key frame of the sub-channel upon detecting the key frame of the main channel by the key frame recognizer, and after outputting the key frame of the sub-channel, outputting the key frame of the main channel and its succeeding frames; and a video decoder for decoding frames of one of the main channel and the sub-channel, output from the channel selector, and outputting video signals.

4. The multichannel video reception apparatus of claim 3, further comprising a video selector for separately outputting the decoded video signals for the main channel and the sub-channel.

5. The multichannel video reception apparatus of claim 4, wherein upon failure to detect the key frame of the main channel, the video selector outputs the video signal output from the video decoder as a main-channel video image after waiting a one-frame processing time of the video decoder, and upon detecting the key frame of the main channel, the video selector outputs the video signal output from the video decoder as a sub-channel video image after waiting the one-frame processing time of the video decoder.

6. The multichannel video reception apparatus of claim 3, wherein the key frame includes an Instantaneous Decoder Refresh (IDR) type frame defined in MPEG-4 part-10/H.264.

7. The multichannel video reception apparatus of claim 3, wherein the key frame includes an Intra (I) type frame defined in one of MPEG-4 part-2 and H.263.

8. The multichannel video reception apparatus of claim 3, wherein the key frame extractor stores the latest sub-channel key frame until the key frame of the main channel is detected.

9. A multichannel video reception method for receiving digital broadcasting, the method comprising the steps of:

receiving a frame representing coded video data of a main channel, and determining whether the received frame of the main channel is a key frame;

if the received frame of the main channel is not a key frame, decoding a non-key frame of the main channel and outputting the decoded non-key frame as a video signal of the main channel;

if the received frame of the main channel is a key frame, decoding a previously stored latest key frame of a sub-channel, and outputting the decoded key frame as a video signal of the sub-channel; and after decoding the key frame of the sub-channel, decoding a key frame of the main channel and outputting the decoded key frame of the main channel as a video signal of the main channel, wherein the main channel and the sub-channel are respectively determined among a plurality of channels according to a predetermined priority.

10. The multichannel video reception method of claim 9, wherein the decoded video signals are separately output for the main channel and the sub-channel according to whether the key frame of the main channel is detected.

11. The multichannel video reception method of claim 9, wherein the key frame includes an Instantaneous Decoder Refresh (IDR) type frame defined in MPEG-4 part-10/H.264.

12. The multichannel video reception method of claim 9, wherein the key frame includes an Intra (I) type frame defined in one of MPEG-4 part-2 and H.263.

13. A multichannel video reception apparatus for receiving digital broadcasting, the apparatus comprising:

a key frame extractor for receiving frames representing coded video data of a sub-channel, extracting a key frame among the frames of the sub-channel, and storing the extracted key frame;

a key frame recognizer for receiving frames representing coded video data of a main channel, and detecting a key frame among the frames of the main channel;

a channel selector for outputting the frames of the main channel upon failure to detect the key frame of the main channel, and upon detecting the key frame of the main channel by the key frame recognizer, outputting the stored key frame of the sub-channel, and after outputting the key frame of the sub-channel, outputting the key frame of the main channel and its succeeding frames; and a video decoder for decoding frames of one of the main channel and the sub-channel, output from the channel selector, and outputting video signals, wherein the main channel and the sub-channel are respectively determined among a plurality of channels according to a predetermined priority.

14. The multichannel video reception apparatus of claim 13, further comprising a video selector for separately outputting the decoded video signals for the main channel and the sub-channel.

15. The multichannel video reception apparatus of claim 14, wherein upon failure to detect the key frame of the main channel, the video selector outputs the video signal output from the video decoder as a main-channel video image after waiting a one-frame processing time of the video decoder, and upon detecting the key frame of the main channel, the video selector outputs the video signal output from the video decoder as a sub-channel video image after waiting the one-frame processing time of the video decoder.

16. The multichannel video reception apparatus of claim 13, wherein the key frame includes an Instantaneous Decoder Refresh (IDR) type frame defined in MPEG-4 part-10/H.264.

17. The multichannel video reception apparatus of claim 13, wherein the key frame includes an Intra (I) type frame defined in one of MPEG-4 part-2 and H.263.

18. The multichannel video reception apparatus of claim 13, wherein the key frame extractor stores a latest sub-channel key frame until the key frame of the main channel is detected.

* * * * *